United States Patent
Ozawa

(10) Patent No.: US 9,546,750 B2
(45) Date of Patent: Jan. 17, 2017

(54) HOSE CLAMP AND METHOD OF MANUFACTURING THE SAME

(75) Inventor: Takehiko Ozawa, Aichi (JP)

(73) Assignee: TOGO SEISAKUSYO CORPORATION, Aichi-Gun, Aichi (JP)

(*) Notice: Subject to any disclaimer, the term of this patent is extended or adjusted under 35 U.S.C. 154(b) by 127 days.

(21) Appl. No.: 14/364,258

(22) PCT Filed: Feb. 7, 2012

(86) PCT No.: PCT/JP2012/052679
§ 371 (c)(1),
(2), (4) Date: Jun. 10, 2014

(87) PCT Pub. No.: WO2013/118251
PCT Pub. Date: Aug. 15, 2013

(65) Prior Publication Data
US 2014/0331458 A1 Nov. 13, 2014

(51) Int. Cl.
*F16L 33/03* (2006.01)
*B21D 53/36* (2006.01)

(52) U.S. Cl.
CPC .......... *F16L 33/03* (2013.01); *B21D 53/36* (2013.01); *Y10T 24/1418* (2015.01)

(58) Field of Classification Search
CPC .. F16L 33/03; Y10T 24/1418; Y10T 24/1457; Y10T 24/1463; Y10T 24/1484
See application file for complete search history.

(56) References Cited

U.S. PATENT DOCUMENTS

| 4,425,682 A | 1/1984 | Hashimoto et al. |
| 4,708,377 A * | 11/1987 | Hunting ............... F16L 23/04 24/20 S |

(Continued)

FOREIGN PATENT DOCUMENTS

| CN | 1115364 | 1/1996 |
| EP | 0443681 A2 | 8/1991 |

(Continued)

OTHER PUBLICATIONS

European Search Report dated Sep. 24, 2015 for EP 12868212.7 (10 pages).

(Continued)

*Primary Examiner* — Robert J Sandy
*Assistant Examiner* — Rowland Do
(74) *Attorney, Agent, or Firm* — Smith, Gambrell & Russell, LLP

(57) ABSTRACT

The pinching operation is facilitated. A hose clamp (H1) is formed by bending a strip-like plate material (1) into a ring-like configuration, and includes a first end portion (5) having a first pinching operation surface (9), and a second end portion (6) having a second pinching operation surface (15). A through-hole (7) is open near the center in the longitudinal direction of the first pinching operation surface (9). At the time of bending into ring-like configuration, expansion regions (19) arranged at both side portions in the width direction of the second pinching operation surface (15) are folded at folding edges (20) with respect to a proximal region (18), whereby the second pinching operation surface (15) is narrowed in the width direction and can enter the through-hole (7). After bending into ring-like configuration, the expansion regions (19) are unfolded at the folding edges (20) and regain a widened state.

18 Claims, 15 Drawing Sheets

(56) References Cited

U.S. PATENT DOCUMENTS

| | | | | |
|---|---|---|---|---|
| 4,930,191 A * | 6/1990 | Takahashi | ............... | F16L 33/03 |
| | | | | 24/20 CW |
| 5,185,907 A * | 2/1993 | Kawashima | ............ | F16L 33/03 |
| | | | | 24/20 CW |
| 5,203,809 A | 4/1993 | Oetiker | | |
| 5,487,209 A | 1/1996 | Oetiker | | |
| 5,706,557 A * | 1/1998 | Beicht | ..................... | F16L 33/03 |
| | | | | 24/20 CW |
| 5,855,044 A | 1/1999 | Cradduck | | |
| 6,098,251 A * | 8/2000 | Zielinski | ................. | F16L 33/03 |
| | | | | 24/20 EE |
| 6,343,407 B1 * | 2/2002 | Muto | ..................... | F16L 33/03 |
| | | | | 24/20 CW |
| 6,389,650 B1 * | 5/2002 | Yamada | .................. | F16L 33/03 |
| | | | | 24/20 CW |
| 7,305,740 B2 * | 12/2007 | Pina | ........................ | F16L 33/03 |
| | | | | 24/20 CW |
| 8,171,603 B2 * | 5/2012 | Nakamura | .............. | F16L 33/03 |
| | | | | 24/20 CW |
| 8,695,172 B2 * | 4/2014 | Nagai | ..................... | F16L 33/03 |
| | | | | 24/20 EE |
| 8,850,664 B2 * | 10/2014 | Nakamura | .............. | F16L 33/03 |
| | | | | 24/20 CW |
| 2003/0084548 A1 * | 5/2003 | Nakamura | .............. | F16L 33/03 |
| | | | | 24/20 R |

FOREIGN PATENT DOCUMENTS

| | | |
|---|---|---|
| GB | 2087468 | 5/1982 |
| JP | 57-61270 Y2 | 12/1982 |
| JP | 58-29339 Y2 | 6/1983 |
| JP | 58-53233 B2 | 11/1983 |
| JP | 2560663 Y2 | 1/1998 |
| JP | 2561820 Y2 | 2/1998 |

OTHER PUBLICATIONS

International Search Report for PCT/JP2012/052679 mailed Mar. 6, 2012 (with English Translation).

\* cited by examiner

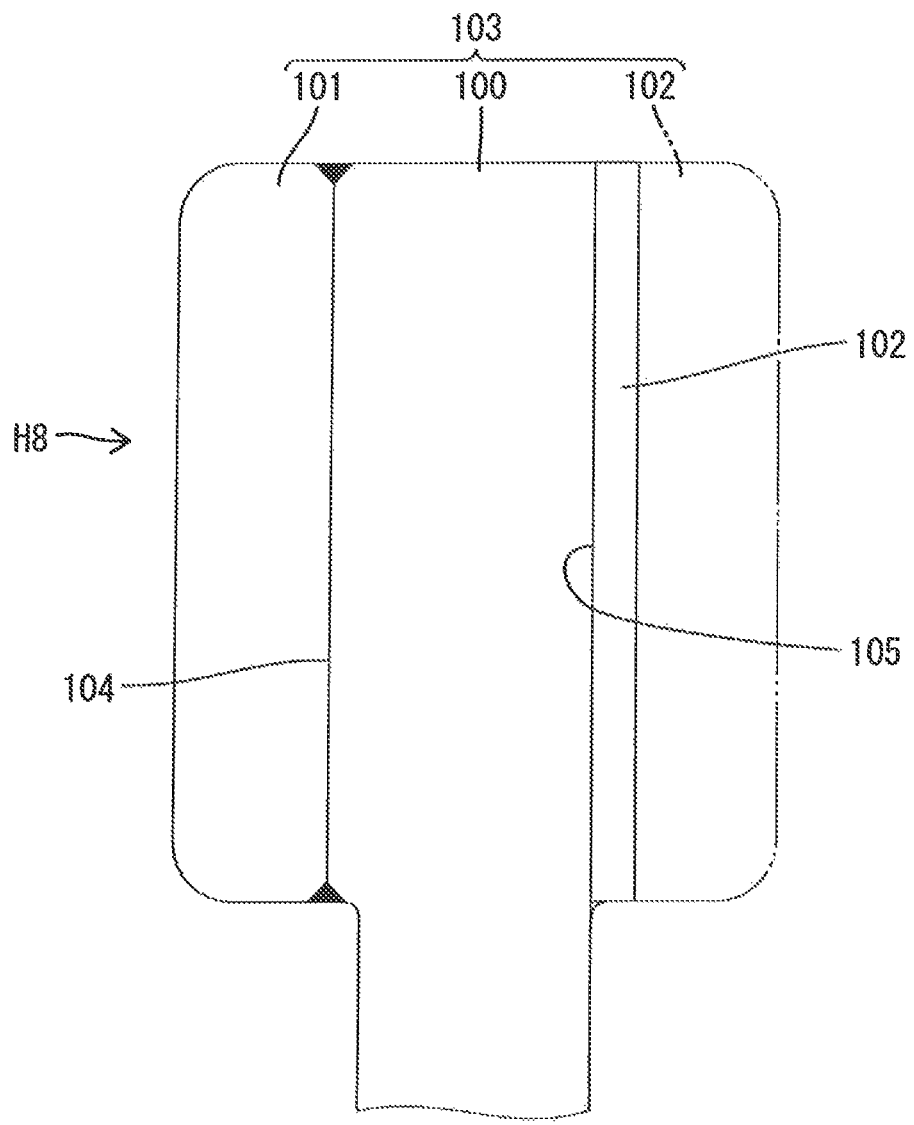

HOSE CLAMP AND METHOD OF MANUFACTURING THE SAME

TECHNICAL FIELD

The present invention relates to a hose clamp and a method of manufacturing the same.

BACKGROUND ART

Patent Document 1 discloses a hose connection device for tightening a connection portion between a hose and a pipe. The hose connection device disclosed in the document has a hose clamp formed in a ring-like configuration. The hose clamp is formed by bending a strip-like plate spring material into a ring-like shape; at one longitudinal end side thereof there is formed forked a first end portion where an elongated-hole-like through-hole is open. The range of the first end portion including the through-hole is bent in the radial direction to form a first pinching portion. At the other end side of the hose clamp, there is formed a second end portion of a smaller width than the opening width of the through-hole. The second end portion is bent in the radial direction so as to form a second pinching portion opposite the first pinching portion.

The above hose clamp disclosed can maintain the first and second pinching portions brought close to each other in a state in which they are held together by a holder, whereby it is possible to maintain the hose clamp in a state in which its inner diameter is increased. On the other hand, by removing the holder, the hose clamp undergoes transition to a reduced-diameter state due to its own elastic force, making it possible to tighten the connection portion between the hose and the pipe.

PRIOR ART DOCUMENT

Patent Documents

Patent Document 1: Japanese Utility Model Registration No. 2561820

SUMMARY OF THE INVENTION

Problem to be Overcome by the Invention

As described above, when the hose clamp is formed into a ring-like shape through bending, the second end portion must pass through the through-hole on the first end portion side. Thus, the width dimension of the second end portion must be equal to or smaller than the opening width of the through-hole. Thus, due to the restriction by the opening width of the through-hole, it is rather difficult for the second pinching portion to secure a sufficient width dimension. Thus, the width of the second pinching portion is rather small, and the difference in width dimension between the first and second pinching portions is large, so that the pinching operation on the two pinching portions is likely to be rather unbalanced. As a result, it is rather hard to perform pinching operation on the above hose clamp.

The present invention has been completed in view of the above problem; it is accordingly an object of the present invention to provide a hose clamp helping to facilitate the pinching operation, and a method of manufacturing the same.

Means for Overcoming the Problem (First Invention)

According to a first aspect of the present invention, there is provided a hose clamp which is formed into a ring-like shape by bending a strip-like plate material so as to cause it to cross itself in a peripheral plane to thereby form a tightening portion and which can tighten a connection portion between a hose and a mating member thereof by means of this tightening portion, the hose clamp comprising:

a first end portion arranged at one longitudinal end side and having a first pinching operation surface at an end portion thereof; and a second end portion arranged at the other longitudinal end side and having at an end portion thereof a second pinching operation surface opposite the first pinching operation surface, wherein at least one of the first pinching operation surface and the second pinching operation surface is formed by:

a proximal region not including a portion interfering with the first end portion or the second end portion constituting a mating side when the plate material is bent into a ring-like shape along an X-axis constituting a center axis extending along the longitudinal direction thereof, and an expansion region including a portion interfering with the first end portion or the second end portion constituting the mating side when the plate material is bent along the X-axis into the ring-like shape; and, there is formed, between the proximal region and the expansion region, at least one of a folding edge allowing folding of the expansion region to a non-interference position where it does not interfere with the first end portion or the second end portion constituting the mating side when the plate material is bent along the X-axis, and a connection edge for connecting the expansion region formed separately from the proximal region.

According to the present invention, when the strip-like plate material is bent into a ring-like shape, the expansion region is previously folded with respect to the proximal region via the folding edge, or the proximal region is previously caused to stay singly, in at least one of the first pinching operation surface and the second pinching operation surface. By doing so, it is possible for the plate material to avoid the interference when it is bent along the X-axis. After this, the expansion region is unfolded, or the separate expansion region is connected to the singly staying proximal region via the connection edge, whereby it is possible to enlarge the operation area of at least one of the first pinching operation surface and the second pinching operation surface. As a result, it is possible to facilitate the pinching operation.

The following features may be added to the hose clamp according to the first invention:

(1) The plate material is formed substantially in line symmetry with respect to the X-axis;

there is provided an elongated-hole-like through-hole which is open on the first end portion side and nearer to the center in the longitudinal direction than the first pinching operation surface;

there is provided a small-width portion which is formed on the second end portion side and nearer to the center in the longitudinal direction than the second pinching operation surface and which can enter the through-hole;

the expansion region is arranged at a side edge portion in the width direction of the proximal region;

in the state in which the expansion region is folded at the folding edge or in which the expansion region separate from the proximal region is separated from the proximal region to stay singly, an outer width dimension of the second pinching operation surface is set to be equal to or smaller than an opening width of the through-hole to allow its insertion into the through-hole; and, in the state in which the expansion region is unfolded at the folding edge to be developed outwards in the width direction or in which the expansion region is firmly attached to a side edge in the width direction of the proximal region via the connection edge, the outer width dimension of the second pinching operation surface is set to be larger than the opening width of the through-hole.

In this construction, when the plate material is bent into a ring-like shape along the X-axis, the expansion region is folded at the folding edge, or the proximal region stays singly, so that the second pinching operation surface allows its insertion without involving interference with the hole edge of the through-hole. After the insertion, the expansion region is unfolded to be developed outwardly in the width direction, or the expansion region is connected to the side edge of the proximal region staying singly via the connection edge, and the outer width dimension of the second pinching operation surface expands in the width direction. As a result, the outer width of the second pinching operation surface is made larger than the opening width of the through-hole, so that it is possible to attain a satisfactory pinching-operability. In addition, the hose clamp as a whole is substantially in line symmetry with respect to the X-axis, so that it is also possible to make the stress applied to the hose clamp well-balanced with respect to the X-axis.

(2) The plate material is formed substantially in point symmetry with respect to a Y-axis orthogonal to the X-axis and passing the center in the longitudinal direction of the plate material;

at the first end portion and the second end portion, there are formed, nearer to the center in the longitudinal direction than the first pinching operation surface and the second pinching operation surface, lightening regions cut away from one side edge extending along the longitudinal direction to a position reaching the X-axis or beyond the same so as to be directed opposite each other;

in the first pinching operation surface and the second pinching operation surface, the expansion regions are arranged at side edge portions in the width direction of the proximal regions;

in a state in which the expansion regions are folded at the folding edges or in which the expansion regions separate from the proximal regions are separated from the proximal regions to stay singly, side edges in the width direction of the first pinching operation surface and the second pinching operation surface extend along the X-axis or are spaced away from each other without crossing the X-axis, whereby, when the plate material is bent along the X-axis, the first pinching operation surface and the second pinching operation surface can pass the corresponding lightening regions; and in a state in which the expansion regions are unfolded at the folding edges to be developed outwards in the width direction or in which the expansion regions are firmly attached to side edges in the width direction of the proximal regions via connection edges, the first pinching operation surface and the second pinching operation surface are enlarged in width in the width direction, crossing the X-axis in a staggered fashion.

In this construction, when bending the plate material along the X-axis into a ring-like configuration, both pinching operation surfaces can pass the lightening regions. After the passing, the expansion regions are unfolded, or are connected to the proximal regions to cross the X-axis in a staggered fashion with respect to each other. That is, the pinching operation surfaces are both enlarged in width, whereby it is possible to provide a satisfactory pinching-operability. In addition, the hose clamp as a whole is substantially in point symmetry with respect to the Y-axis, so that it is possible to balance the stress applied to the hose clamp with respect to the Y-axis.

(3) In at least one of the first pinching operation surface and the second pinching operation surface, there is formed, on the surface on the side opposite the surfaces of these pinching operation surfaces facing each other, a protrusion protruding outwardly in the thickness direction.

In this construction, when the operator performs pinching operation on the first and second pinching operation surfaces, the finger of the operator is applied to the protrusion, and does not touch the edge portions at the peripheral edges of both pinching operation surfaces, so that there is little danger of the finger being injured.

(4) At least one of peripheral edge portions of at least one of the first and second pinching operation surfaces is formed with an escape portion which is bent so as to extend toward the opposing surface side.

In this construction, there are included peripheral edges of both pinching operation surfaces bent toward the opposing surface side due to the escape portions, whereby the peripheral edges constituting the edges of both pinching operation surfaces are spaced away from the finger, so that it is possible for the finger to avoid touching the edge portions. Thus, it is possible to avoid a situation in which the operator suffers injury of his finger.

(5) A recess or a through-hole for slip-prevention is formed in at least one of the first and second pinching operation surfaces.

In this construction, when the operator performs pinching operation on the first pinching operation surface or the second pinching operation surface, the peripheral edge of the hole or the recess serves as a catcher to effect slip-prevention.

(Second Invention)

According to a second aspect of the invention of this application, there is provided a hose clamp manufacturing method in which a strip-like plate material is bent into a ring-like configuration so as to cross itself in a peripheral plane to tighten a connection portion between a hose and a mating member thereof, the method including the steps of:

an outer width adjustment step in which both end portion sides of the plate material are formed as a first end portion and a second end portion; a first pinching operation surface and a second pinching operation surface are formed at the respective distal end portions of the first end portion and the second end portion, and a passed portion is formed nearer to the center in the longitudinal direction than the pinching operation surface of at least one of the two pinching operation surfaces; and, prior to the bending of the plate material along an X-axis that is a center axis along the longitudinal direction thereof into an annular configuration, at least the other of the two pinching operation surfaces is shaped in an interference avoiding form exhibiting an outer width dimension not involving interference with a portion around the passed portion;

a tightening portion forming step in which the plate material is bent into an annular configuration along the X-axis, with the center in the longitudinal direction thereof being at the lowermost point, and at least the other of the two pinching operation surfaces is caused to pass the passed portion, whereby the first end portion and the second end portion are caused to cross each other in the peripheral plane to form a tightening portion capable of deformation so as to be reduced and increased in diameter; and a width enlarging step in which, after the tightening portion forming step, at least the other of the two pinching operation surfaces is worked into an enlarged-width form in which it is expanded in the width direction.

It is possible to add the following features to the hose clamp manufacturing method constituting the second invention:

(1) The passed portion is a through-hole formed at the first end portion in an elongated-hole-like configuration; in the outer width adjustment step, both side portions in the width direction of the second pinching operation surface are folded to be thereby converted to the interference avoiding form in which an overall outer width thereof is equal to or smaller than an opening width of the through-hole; and, in the tightening portion forming step, this second pinching operation surface is inserted into the through-hole, and both side portions in the width direction are unfolded in the width enlarging step, whereby the second pinching operation surface is converted to the enlarged-width form.

(2) The plate material is formed substantially in point symmetry with respect to a Y-axis orthogonal to the X-axis and passing the center in the longitudinal direction of the plate material; the first pinching operation surface and the second pinching operation surface are both formed in a width range astride two regions on both sides of the X-axis; and, on the other hand, the passed portions respectively arranged on the first end portion side and the second end portion side are both lightening regions cut away inwardly from one side edge of the plate material to a depth reaching the X-axis or beyond the same;

in the outer width adjustment step, the first pinching operation surface and the second pinching operation surface are both folded in the region of the two regions on both sides of the X-axis, where the lightening region is arranged, thereby to be converted to the interference avoiding form in which a side surface in the longitudinal direction of a folded portion extends along the X-axis or is spaced away from the X-axis; and in the width enlarging step, the folded portions of the first pinching operation surface and the second pinching operation surface are unfolded to be converted to the enlarged-width form.

(3) There is included a protrusion forming step in which, in at least one of the first pinching operation surface and the second pinching operation surface, there is formed, on the surface on the side opposite the opposing surface side, a protrusion protruding outwards in the thickness direction.

(4) There is included an escape portion forming step in which, in at least one of the first pinching operation surface and the second pinching operation surface, there is formed an escape portion by bending at least one of peripheral edges toward the opposing surface side.

(5) There is included a step for forming a recess or a through-hole for slip-prevention in at least one of the first and second pinching operation surfaces.

BRIEF DESCRIPTION OF THE DRAWINGS

FIG. 15 is an enlarged view of the main portion of a hose clamp according to embodiment 8.

MODE FOR CARRYING OUT THE INVENTION

Embodiment 1

Figure 1:
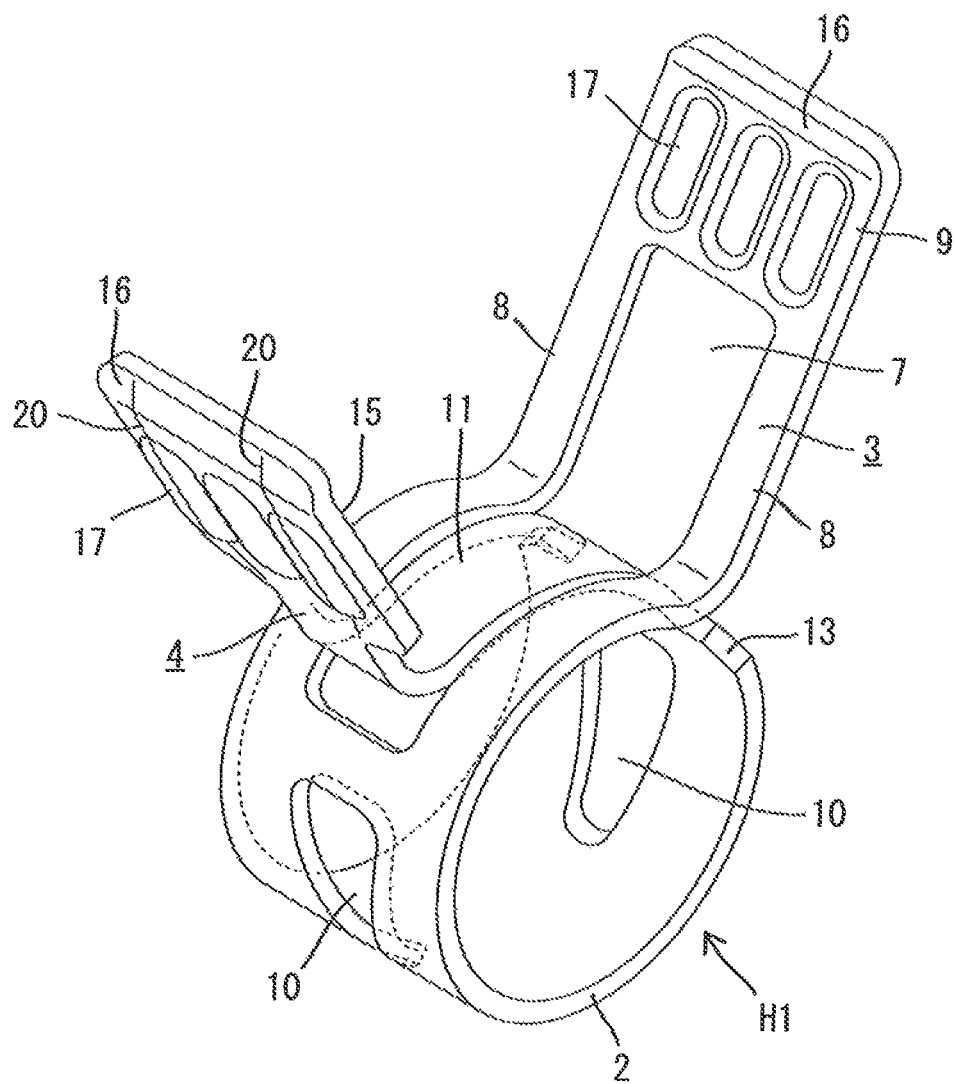
FIG. 1 is a perspective view of a hose clamp according to embodiment 1.
Figure 2:
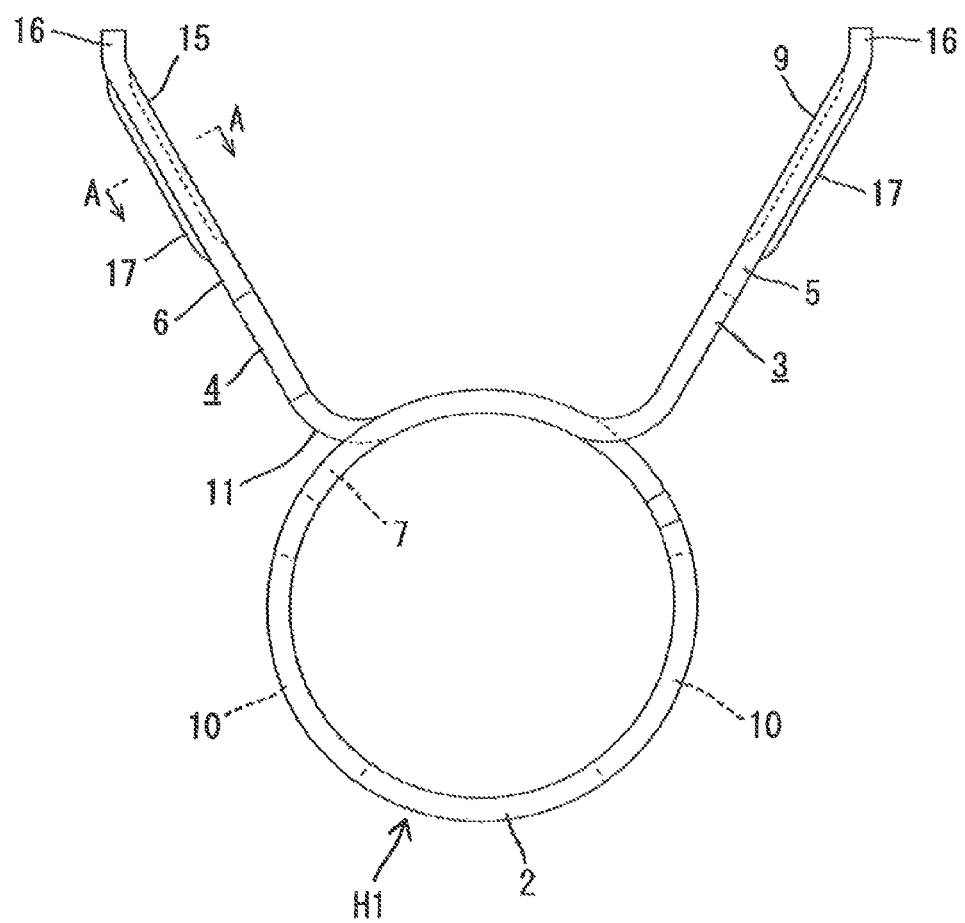
FIG. 2 is a front view of the same.

In the following, embodiment 1 of the present invention will be described with reference to FIGS. 1 through 6. A hose clamp H1 according to the present embodiment is formed integrally of a plate material consisting of spring steel. As shown in FIG. 4, in the developed state, the hose clamp is formed as a strip extending in the longitudinal direction (along the X-axis direction mentioned below). This strip-like plate material 1 is bent along the X-axis from the developed state into a ring-like configuration to form a tightening portion 2 capable of elastic deformation so as to be reduced and increased in diameter. Both end portions of the hose clamp protrude radially outwards from the tightening portion 2 to respectively constitute first and second pinching portions 3 and 4. The two pinching portions 3 and 4 are opposite each other in the peripheral direction.

As shown in FIG. 4, the plate material 1 for forming the hose clamp H1 is formed symmetrically with respect to the X-axis, which is the center axis extending along the longitudinal direction. At one end portion (the left-hand side end portion in FIG. 4: a first end portion 5) of the plate material 1 of the hose clamp H1, there is provided an elongated-hole-like through-hole 7 (passed portion) extending in the longitudinal direction. The first end portion 5 is formed in a forked configuration, with connection members 8 being arranged on both sides in the width direction of the through-hole 7. The distal-end side opening end of the through hole 7 is of a large width, and the through-hole is formed so as to be gradually reduced in width as it extends toward the opening end on the opposite side. The region of the first end portion 5 which is on the distal end side of the through-hole 7 is formed as a first pinching operation surface 9.

The range of the plate material 1 of the hose clamp H1 corresponding to approximately ⅔ thereof as measured longitudinally from the distal end of the first end portion 5 exhibits a substantially uniform width dimension between the side edges. A pair of triangular windows 10 are open on one longitudinal side (the side where no through-hole 7 is formed) of this uniform-width region. The two triangular windows 10 are formed substantially in a triangular configuration, and are arranged such that their respective pointed apex portions are opposite each other. Further, as shown in FIG. 4, the two triangular windows 10 are arranged at symmetrical positions with respect to the Y-axis, which passes the center in the longitudinal direction of the plate material and which is orthogonal to the X-axis.

At the other end portion (the right-hand side end portion in FIG. 4: a second end portion 6) of the plate material 1 of the hose clamp H1, there is formed a small-width portion 11 so as to be continuous with the uniform-width region mentioned above. The small-width portion 11 is formed so as to be gradually reduced in width as it extends toward the distal end side of the second end portion 6; even its root portion, at which it is of the largest width, is of a smaller width than the minimum opening width W0 of the through-hole 7. In the process in which the plate material 1 in the developed state is bent along the X-axis into a ring-like configuration, the above-mentioned tightening portion 2 is formed by causing the first end portion 5 and the second end portion 6 to cross each other in the peripheral plane. In this process, the small-width portion 11 is inserted into the through-hole 7 to be situated between the two connection members 8. Further, at this time, the small-width portion 11 is substantially flush with the two connection members 8, constituting a part of the inner peripheral surface of the tightening portion 2 together with the two connection members 8.

Both corners on the first end portion 5 side of the uniform-width region are chamfered into an arcuate shape as indicated by numeral 12, whereas both corners on the small-width portion 11 side thereof are chamfered into a linear shape as indicated by numeral 13. Both chamfered portions 13 are continuous with the small-width portion 11 via arcuate surfaces 13A. The small-width portion 11 is continuous with a second pinching operation surface 15 via a connection portion 14 gradually increased in width.

Figure 3:
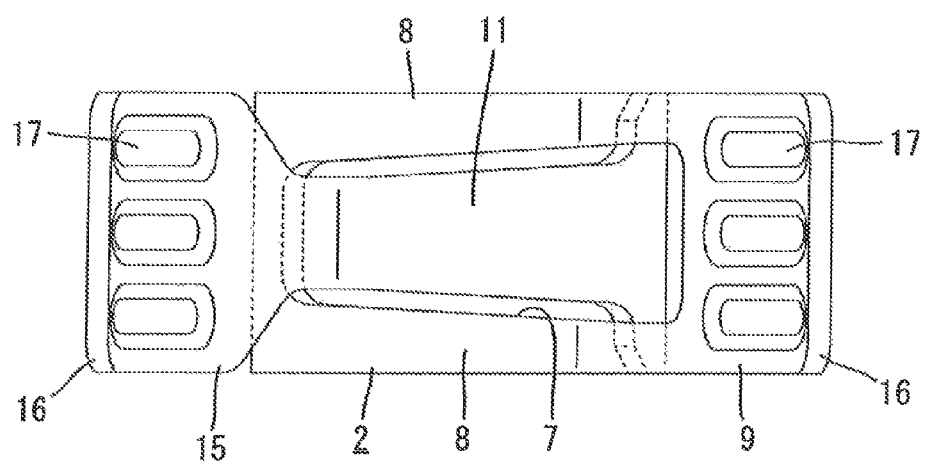
FIG. 3 is a plan view of the same.
Figure 4:
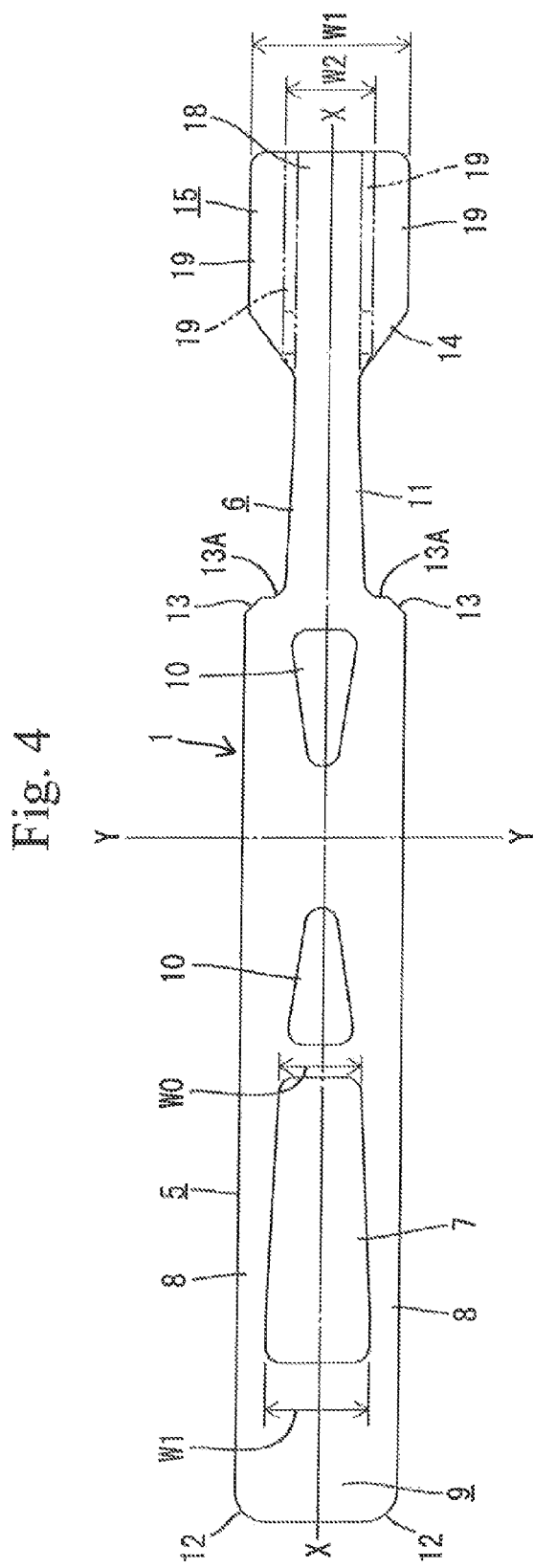
FIG. 4 is a developed view of the same.
Figure 5:
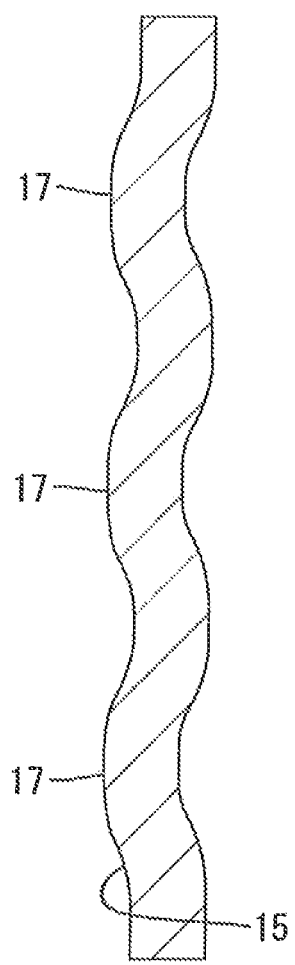
FIG. 5 is a sectional view taken along the line A-A of FIG. 2.

As shown in FIG. 3, the second pinching operation surface 15 is formed in substantially the same width as the first pinching operation surface 9. That is, the second pinching operation surface 15 is formed in a width dimension larger than the maximum opening width W1 of the through-hole 7. Further, as shown in the drawing, the first and second pinching operation surfaces 9 and 15 are opposite each other in the peripheral direction of the tightening portion 2; they are opposite each other in an aligned state while involving substantially no positional deviation in the axial direction of the tightening portion 2.

Each of the upper edges of the first and second pinching operation surfaces 9 and 15 is slightly bent inwardly (toward the mating pinching operation surface) to form an escape portion 16. As a result, when the outer surface sides of the two pinching operation surfaces 9 and 15 are pinched with fingers, even if the upper edge portions of the two pinching operation surfaces 9 and 15 are edged, there is little possibility of the portions being touched by the fingers. Further, each of the pinching operation surfaces 9 and 15 is provided with three protrusions 17. In this embodiment, the protrusions 17 are formed as ribs extending in the vertical direction (the radial direction of the tightening portion 2), and are arranged side by side in the width direction. Further, the protrusions 17 are formed by embossing so that they may protrude on the outer surface side of the two pinching operation surfaces 9 and 15. Even if both side edges in the width direction (the direction of the Y-axis) of the two pinching operation surfaces 9 and 15 are edged, these protrusions 17 help to make it hard for the portions to be touched by the fingers. Further, the protruding surfaces of the protrusions 17 are rounded so as to avoid injuring of fingers at the time of pinching operation.

Next, a method of manufacturing the hose clamp H1 of embodiment 1 will be described with reference to FIG. 6.
(Developed Form Shaping Step: See FIG. 6(I))

First, there is obtained a plate material 1 in the developed shape stamped from base metal in a predetermined configuration. As described above, in this state, the second pinching operation surface 15 is formed in a width larger than the opening width of the through-hole 7. Thus, when the plate material 1 is to be bent along the X-axis into a ring-like configuration, both side portions in the width direction of the second pinching operation surface 15 interfere with the portions around the through-hole 7 (more specifically, the connection members 8) That is, the second pinching operation surface 15 is formed by a proximal region 18 arranged at the center in the width direction and extending to the distal end in substantially the same width as the width dimension of the distal end of the small-width portion and a pair of expansion regions 19 continuous with both side portions in the width direction of the proximal portion 18.
(Outer Width Adjustment Step: See FIG. 6(II))

Figure 6:
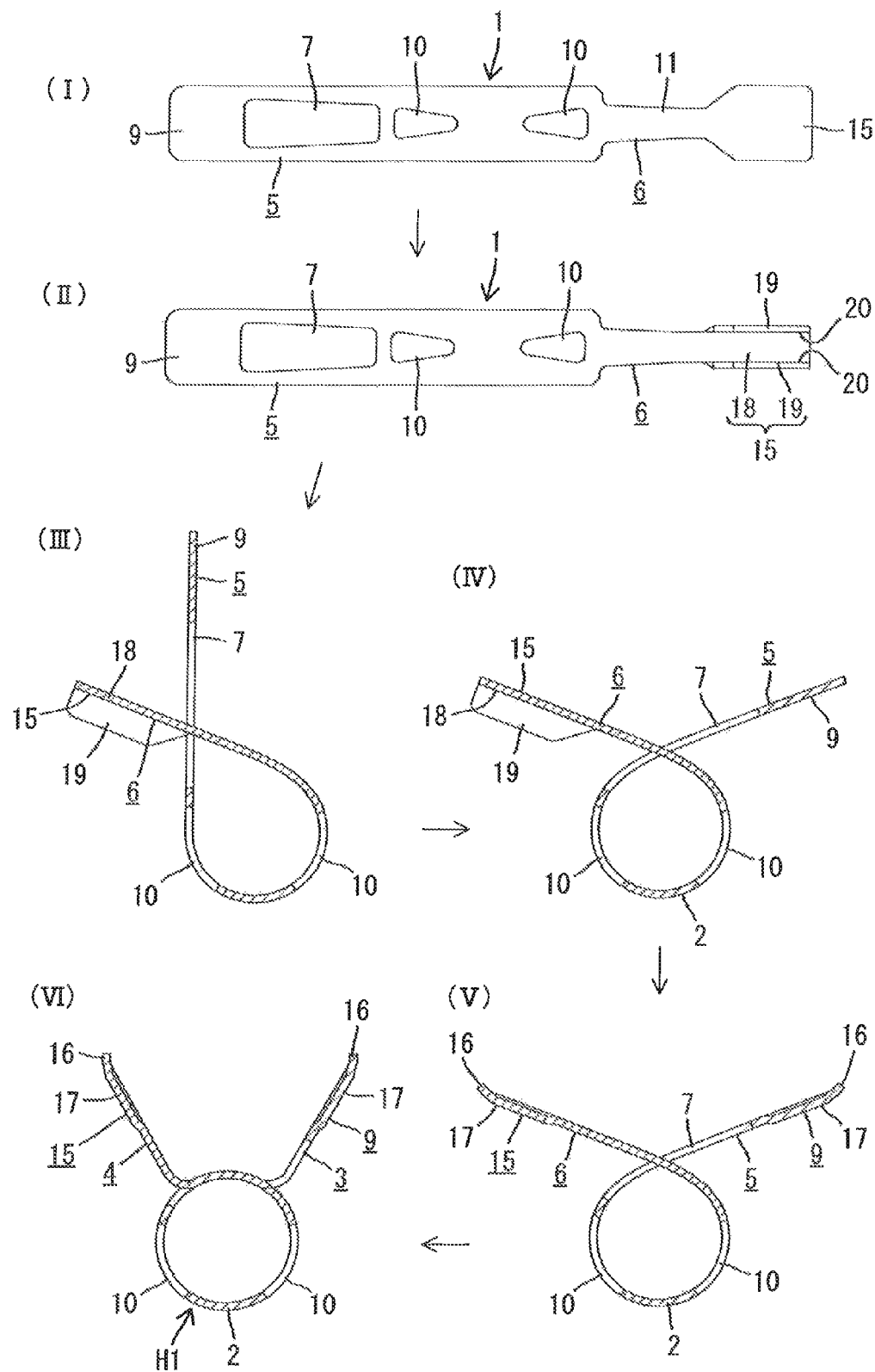
FIG. 6 is a diagram illustrating hose clamp forming steps.

After the developed form shaping step, predetermined bending is performed on both expansion regions 19 of the second pinching operation surface 15 (the state of FIG. 6(II)). That is, folding is performed on the second pinching operation surface 15, inwardly and substantially at a right angle, using the boundaries between the proximal region 18 and both expansion regions 19 as bending edges 20. As a result of this folding, the two expansion regions 19 of the second pinching operation surface 15 face each other, whereby there is obtained a "narrowed form" in which the overall width is reduced (interference avoiding form). The outer width (W2 in FIG. 4) of the second pinching operation surface 15 as a whole in this state is set to be smaller than the minimum opening width (W0) of the through-hole 7. The position in which both expansion regions 19 are thus folded constitutes a non-interference position allowing the second pinching operation surface 15 to enter the through-hole 7 without interference with the opening edge thereof when the plate material is bent along the X-axis into a ring-like configuration.
(Tightening Portion Forming Step: See FIGS. 6(III) and 6(IV))

Next, bending into a ring-like configuration is performed from the developed state. In this case, the plate material 1 in the developed state is bent along the X-axis into an arcuate configuration, with the Y-axis being at the bending apex. Then, after erecting the first end portion 5 side substantially vertically, the bending of the second end portion 6 side is performed prior to the bending of the first end portion 5 side (state (III)). At this time, the second pinching operation surface 15 is caused to enter the through-hole 7 without interference. Subsequently, bending is performed on the first end portion 5 side in a similar manner, whereby the first and second end portions 5 and 6 cross each other in a peripheral plane, with the result that the tightening portion 2 is generally formed.
(Width Enlarging Step: See FIG. 6(V))

In this step, both expansion regions 19, which have been in the folded state, are unfolded around the folding edges 20. As a result, the second pinching operation surface 15 is restored to the original form (enlarged-width form) in which both expansion regions 19 are developed in the width direction. In this embodiment 1, there is performed, during the above step, the formation of the escape portions 16 and the protrusions 17 on the first pinching operation surface 9 and the second pinching operation surface 15 (the protrusion forming step and the escape portion forming step).
(Pinching Portion Forming Step: See FIG. 6(VI))

Finally, working into an arcuate shape is performed on a fixed range of the material immediately behind both end portions 5 and 6 so as to form the circumferential surface of the tightening portion 2, and, at the same time, the first and second end portions 5 and 6, inclusive of both pinching operation surfaces 9 and 15, are erected radially outwards from the peripheral surface of the tightening portion 2. As a result, the first and second pinching portions 3 and 4 face each other in the peripheral direction, thus obtaining a desired hose clamp H1.

In the hose clamp H1 according to the present embodiment 1, constructed as described above, it is possible for the width dimension of the second pinching operation surface 15, which has conventionally been restricted by the opening width of the through-hole 7, can be made larger than the opening width of the through-hole 7. Thus, both pinching operation surfaces 9 and 15 allow easy pinching operation; further, since both pinching operation surfaces 9 and 15 are formed in the same width, it is possible to perform, pinching operation in a well-balanced manner.

Further, in the present embodiment, no torsion is involved when the plate material 1 is bent from the developed state into a ring-like configuration. If any torsion is involved, that will affect the tightening portion 2, and there is a fear of the requisite out not being secured. In the present embodiment, however, no torsion is involved, so that the requisite out-of-roundness of the tightening portion is secured, with the result that it is possible to tighten the hose uniformly over the entire periphery thereof, thus making it possible to realize a high level of sealing property.

Further, in the hose clamp H1 of the present embodiment, it is possible to enlarge the overall width dimension of the second pinching operation surface 15 solely by developing the expansion regions 19, which have been in the folded state, into a state in which they are flush with the proximal region 18, so that working for the expansion is easy to perform. Furthermore, at the upper edges of the first and second pinching operation surfaces 9 and 15, there are formed the escape portions 16 through bending, and the three protrusions 17 are formed on each of the two surfaces, whereby the upper edges and both side edges in the width direction of both pinching operation surfaces 9 and 15, which consist of cutaway surfaces, are not easily touched by the fingers of the operator. Thus, it is possible to avoid injuring of the fingers of the operator.

Embodiment 2

Figure 7:
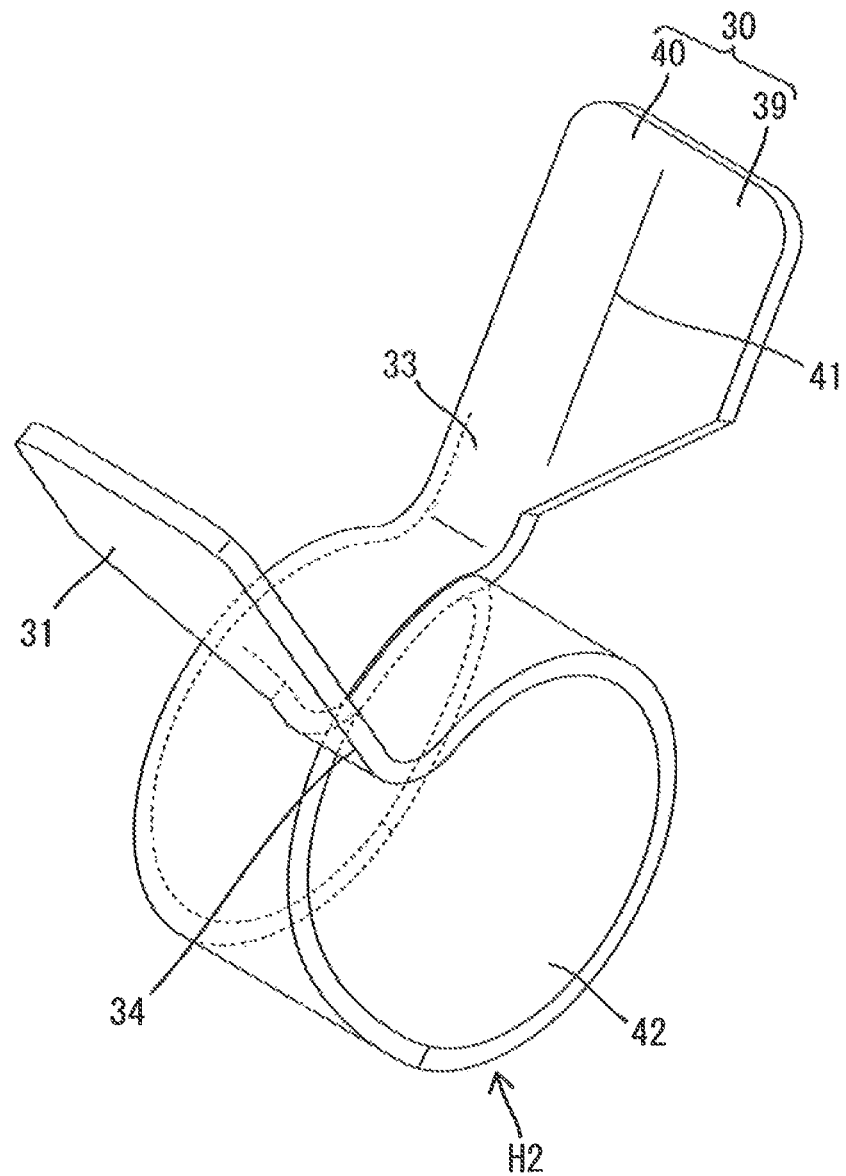
FIG. 7 is a perspective view of a hose clamp according to embodiment 2.
Figure 8:
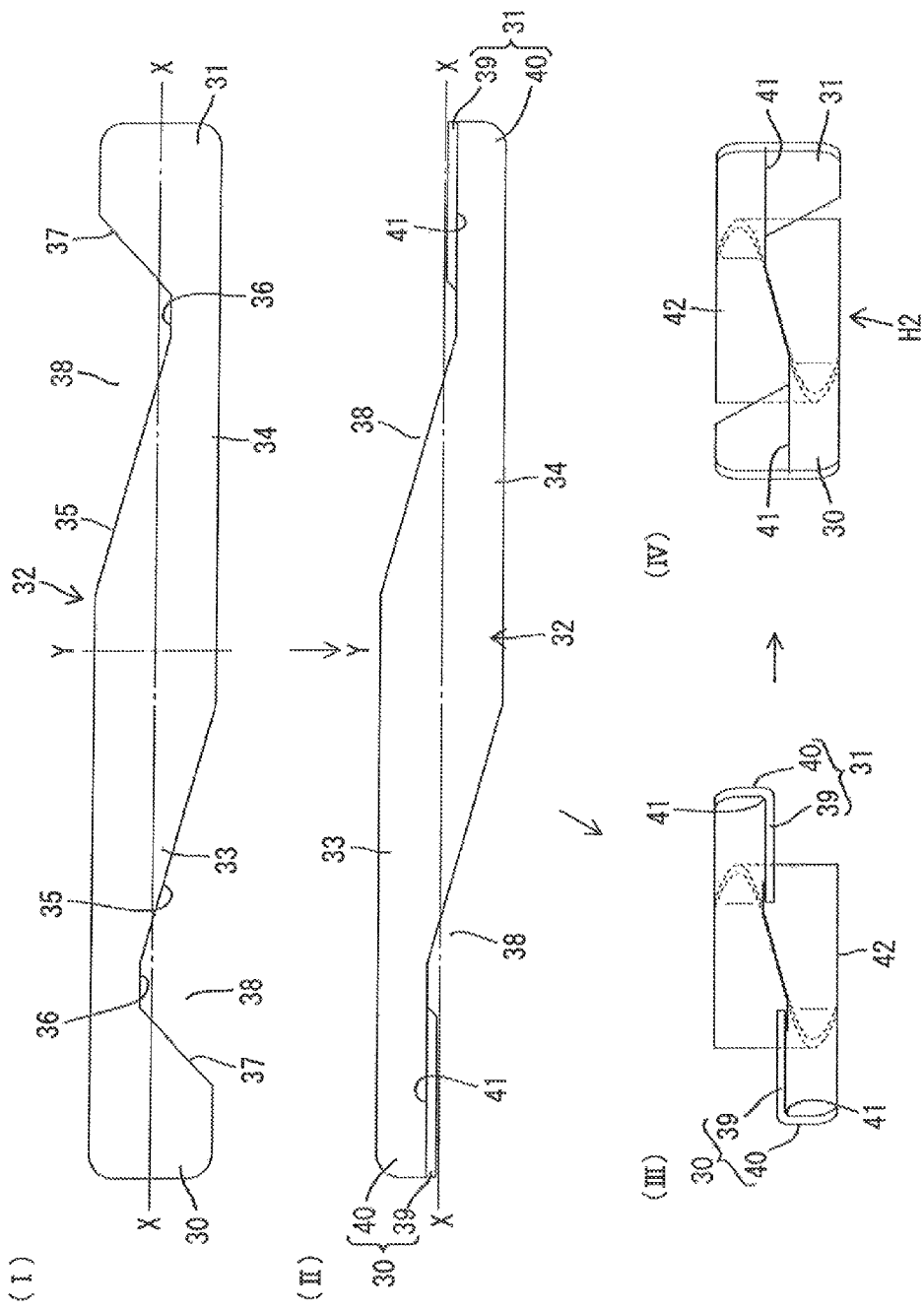
FIG. 8 is a diagram illustrating the forming steps for the same.

FIGS. 7 and 8 show embodiment 2 of the present invention.

As shown in FIG. 7, the hose clamp H2 according to embodiment 2 has no through-hole 7. In the hose clamp H2 of the present embodiment, a first pinching operation surface 30 and a second pinching operation surface 31 cross each other in the axial direction in a staggered manner. Although the triangular windows 10 of embodiment 1 are not shown in FIG. 7, they may be provided as in embodiment 1.

The hose clamp H2 according to embodiment 2 is manufactured by the steps shown in FIG. 8. As shown in FIG. 8(I), a plate material 32 in the developed state is of a configuration in point symmetry with respect to the Y-axis (the developed form shaping step). As shown in FIG. 8(I), one side edge in the longitudinal direction of the plate material 32 (the side edge shown on the lower side in the drawing) extends straight along the X-axis from the distal end of a second end portion 34, and reaches a predetermined position beyond the Y-axis; then it is continuous with a gentle slope 35 extending inwards. The terminal end of the gentle slope 35 is situated slightly beyond the X-axis. From the terminal end of the gentle slope 35, a straight surface 36 extends by a predetermined length in parallel with the X-axis toward the first end portion 33 side; then, it is continuous with a steep slope 37 extending outwards. The steep slope 37 is continuous with a position spaced away from the distal end of the first end portion 33 by a predetermined distance. Thus, on one side edge of the first end portion 33, there is formed a lightening region 38 formed by the gentle slope 35, the straight surface 36, and the steep slope 37, whereby the first pinching operation surface 30 is formed on the distal end side of the first end portion 33 with respect to the lightening region 38.

Also on the other side edge of the plate material 32 (the side edge shown in the upper side in the drawing), there is formed the lightening region 38 in point symmetry, and the second pinching operation surface 31 is formed in a similar fashion.

In the hose clamp H2, before the bending from the developed state, there is performed folding on first and second pinching operation surfaces 30 and 31 as shown in FIG. 8(II) (the outer width adjustment step). That is, in the first pinching operation surface 30, when the plate material 32 is bent along the X-axis into a ring-like configuration, one side portion situated on the lower side of the X-axis in FIG. 8 interferes with the portion around the lightening region 38 on the second end portion 34 side, so that the region including that portion constitutes an expansion region 39, and the remaining region constitutes a proximal region 40. On the other hand, in the second pinching operation surface 31, one side portion situated on the upper side of the X-axis in FIG. 8 interferes with the first end portion 33 side, so that the region including that portion constitutes the expansion region 39, and the remaining region constitutes the proximal region 40.

In the outer width adjustment step, the expansion regions 39 of the first pinching operation surface 30 and of the second pinching operation surface 31 are folded inwards at a folding edge 41 extending along the X-axis (to the front side with respect to the plane of the drawing) substantially at a right angle. As a result, the outer surfaces of the expansion regions 39 of the first pinching operation surface 30 and of the second pinching operation surface 31 are slightly on the inner side of the X-axis without being situated beyond the X-axis. Thus, by the outer width adjustment step, the first pinching operation surface 30 and the second pinching operation surface 31 are shaped into an interference avoiding form reduced in the width direction.

From the state of FIG. 8(II), bending into a ring-like configuration is performed along the X-axis, with the Y-axis being at the bending apex (the tightening portion forming step). In this process, the outer surfaces of the expansion regions 39 of the first pinching operation surface 30 and the second pinching operation surface 31 are situated slightly on the inner side of the X-axis as a result of the above folding of the expansion regions 39, so that, when bending into a ring-like configuration is performed along the X-axis, the pinching operation surfaces can cross each other in a peripheral plane while forming a tightening portion 42 without involving any interference with the mating end portion. Thus, also in the present embodiment, there is no need to involve torsion at the time of bending into a ring-like configuration, which contributes to the maintaining of the requisite out-of-roundness of the tightening portion 42.

As shown in FIG. 8(III), as a result of the above bending, the edge portions in the two lightening regions 38 are aligned so as to the flush with each other.

After this, the expansion regions 39 are unfolded to the original state (See FIG. 8(IV): the width enlarging step). Through this step, the first and second pinching operation surfaces 30 and 31 are restored to the original form (enlarged-width form) developed in the width direction. Further, in this step, there is also performed working to erect the first and second end portion 33, 34 sides inclusive of the two pinching operation surfaces 30 and 31 radially outwards so as to cause to face them each other. In this way, the hose clamp H2 according to embodiment 2 is obtained.

Although not shown in the drawings, also in embodiment 2, the escape portions and the protrusions are formed as in embodiment 1 (the protrusion forming step and the escape portion forming step).

The hose clamp H2 according to embodiment 2 thus obtained also provides the same effect as that of embodiment 1.

Embodiment 3

Figure 9:
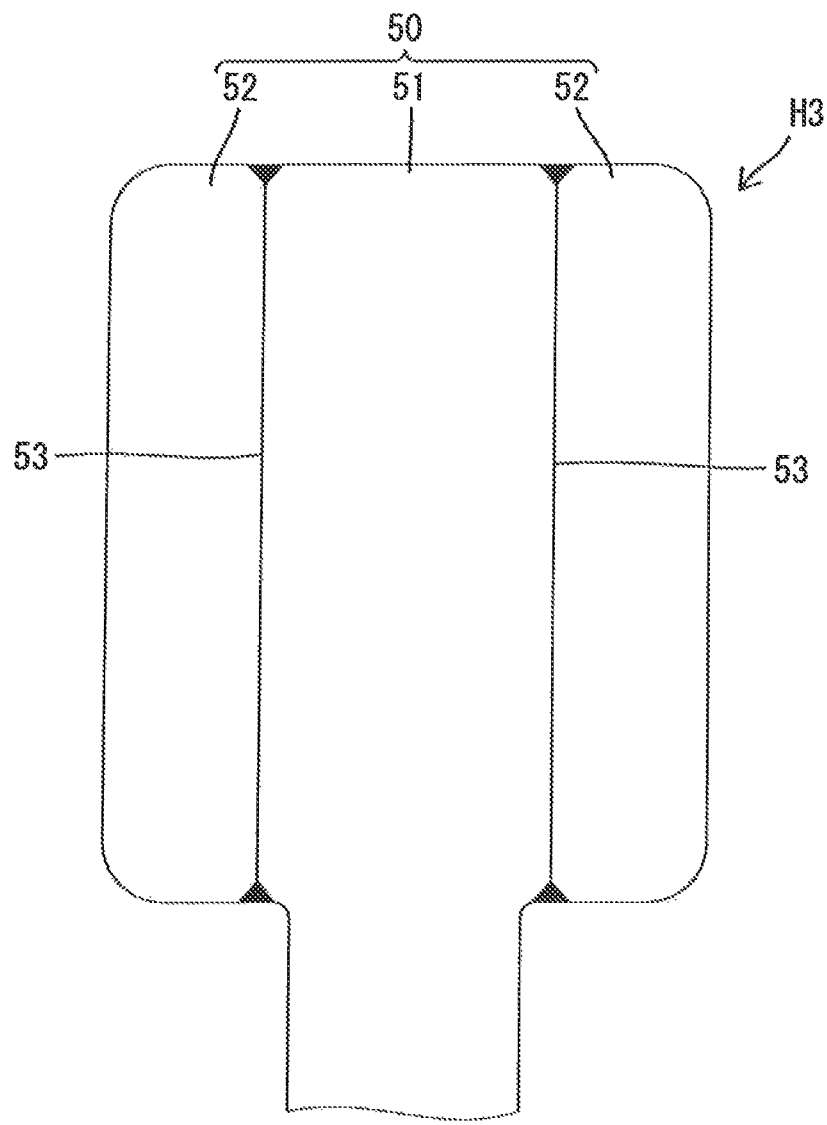
FIG. 9 is an enlarged view of the main portion of a hose clamp according to embodiment 3.

FIG. 9 shows a second pinching operation surface 50 of a hose clamp H3 according to embodiment 3 of the present invention; the first pinching operation surface can be formed in the same manner. In the hose clamp H3 of embodiment 3, expansion regions 52 are separate from a proximal region 51 when the plate material is in the developed state. That is, in embodiment 3, the proximal region 51 is caused to singly enter a through-hole (not shown), and then the pair of expansion regions 52 are mounted to both side edges in the width direction of the proximal region 51 by welding or the like via connection edges 53.

In the present embodiment, the width dimension of the proximal region 51 alone is smaller than the minimum opening width of the through-hole (not shown); however, the outer width dimension of the second pinching operation surface 50 in the state in which both expansion regions 52 have been attached is set to be larger than the maximum opening width of the through-hole.

In the present embodiment also, it is possible to form the escape portions and the protrusions on the first and second pinching operation surfaces.

Embodiment 3, formed as described above, can provide the same effect as that of embodiment 1.

Embodiment 4

Figure 10:
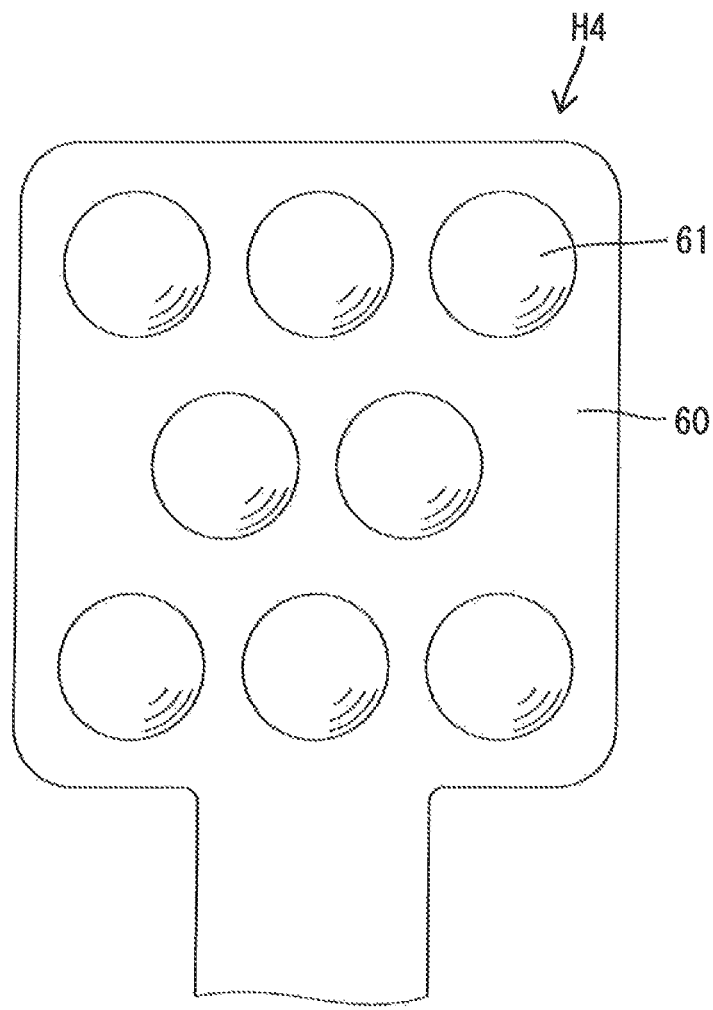
FIG. 10 is an enlarged view of the main portion of a hose clamp according to embodiment 4.

FIG. 10 illustrates a second pinching operation surface 60 of a hose clamp H4 according to embodiment 4 of the present invention as seen from the outer surface (the surface undergoing pinching operation by a finger) side; a first pinching operation surface can be formed in the same manner. While in embodiment 1 the protrusions 17 are of a rib-like configuration, protrusions 61 of the present embodiment are of semi-spherical configuration. As in embodiment 1, the protrusions 61 are embossed so as to protrude from the inner surface side to the outer surface side of the first and second pinching operation surfaces.

In the present embodiment also, it is possible to form the escape portions at the upper edges of the first and second pinching operation surfaces.

Embodiment 5

Figure 11:
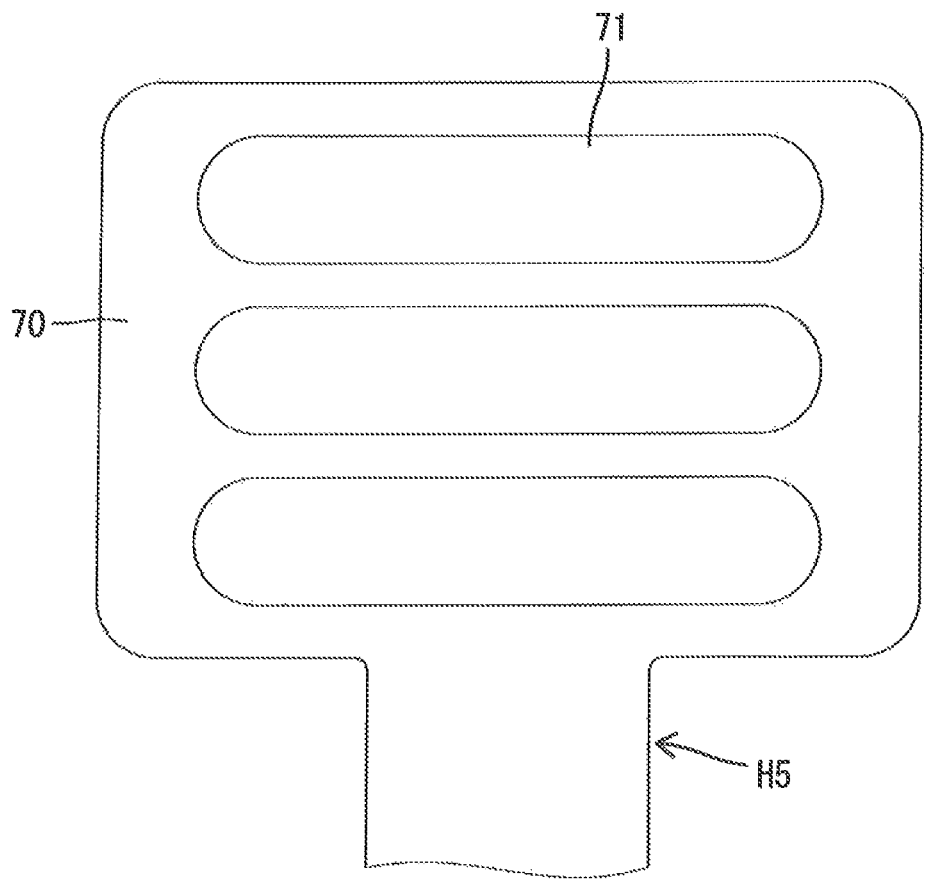
FIG. 11 is an enlarged view of the main portion of a hose clamp according to embodiment 5.

FIG. 11 illustrates a second pinching operation surface 70 of a hose clamp H5 according to embodiment 5 of the present invention as seen from the outer surface side; a first pinching operation surface can be formed in the same manner. While in embodiment 1 the protrusions 17 are formed as ribs elongated in the longitudinal direction, protrusions 71 of embodiment 5 are formed as ribs elongated in the lateral direction (width direction).

In the present embodiment also, it is possible to form the escape portions at the upper edges of the first and second pinching operation surfaces. Further, although not shown, the direction in which the protrusions 17, 71 are formed is not restricted to the longitudinal direction or the lateral direction; it may also be an oblique direction crossing the width direction.

Embodiment 6

Figure 12:
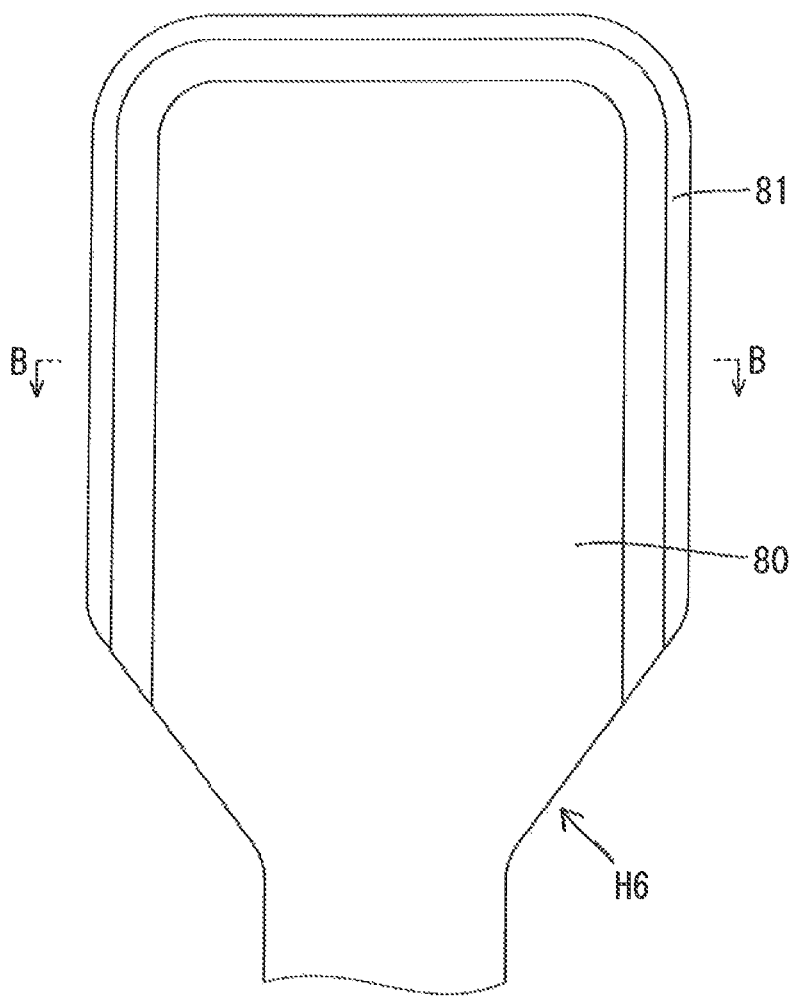
FIG. 12 is an enlarged view of the main portion of a hose clamp according to embodiment 6.
Figure 13:
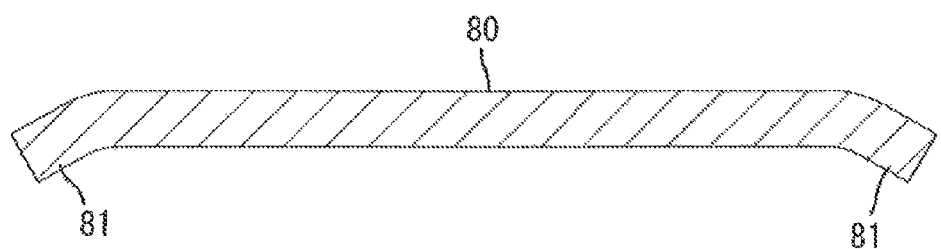
FIG. 13 is a sectional view taken along the line B-B of FIG. 12.

FIGS. 12 and 13 illustrate a second pinching operation surface 80 of a hose clamp H6 according to embodiment 6 of the present invention as seen from the inner surface side; a first pinching operation surface can also be formed in the same manner. In the present embodiment, the portion of the second pinching operation surface 80 extending from the upper edge thereof to both side edges in the width direction is bent toward the inner surface side (the side not undergoing pinching operation by a finger of the operator) to thereby form an escape portion 81. In this construction, if no protrusions are formed, it is possible to prevent fingers of the operator from touching the upper edges and both side edges in the width direction of both pinching operation surfaces, which are cutaway surfaces.

In the present embodiment also, the protrusions may be formed along with the escape portions.

Embodiment 7

Figure 14:
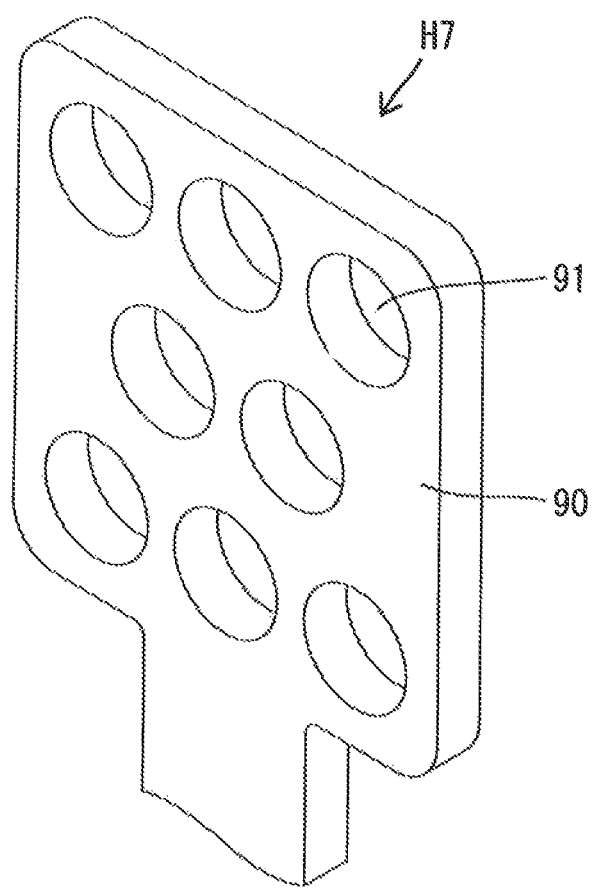
FIG. 14 is an enlarged perspective view of the main portion of a hose clamp according to embodiment 7.

FIG. 14 illustrates a second pinching operation surface 90 of a hose clamp H7 according to embodiment 7 of the present invention; a first pinching operation surface can be formed in the same manner. In the second pinching operation surface 90 of the present embodiment, there are arranged a plurality of through-hole 91 for slip-prevention.

In this construction, the hole edges of the through-holes serve as a catcher, so that it is possible to achieve slip-prevention.

The construction for slip-prevention is not restricted to through-holes; instead, it is also possible to form bottomed recesses recessed to the inner surface side.

Embodiment 8

FIG. 15 illustrates a second pinching operation surface 103 of a hose clamp H8 according to embodiment 8 of the present invention; a first pinching operation surface can be formed in the same manner. In the present embodiment, an expansion region 101 is attached to the left-hand side of a proximal region 100 as seen in the drawing via a connection edge 104, and an expansion region 102 is continuous with the right-hand side thereof as seen in the drawing via a folding edge 105. That is, when the hose clamp H8 is in the developed state, one expansion region 101 is separate from the proximal region 100, whereas the other expansion region 102 is folded at a right angle as shown in the drawing. And, after causing the second pinching operation surface 103 side into a through-hole (not shown), the one expansion region 101 is connected to one side of the proximal region through welding, and the other expansion region 102 is unfolded.

Embodiment 8, constructed as described above, can provide the same effect at that of the other embodiments.

Other Embodiments

The present invention is not restricted to the above-described embodiments but the technical scope of the present invention includes the following modifications.

In the above embodiments the small width portion, inclusive of its root portion of the largest width, is formed in a width dimension allowing this portion to enter the through-hole in its entirety; however, the root portion does not enter the through-hole, so that the width dimension of the root portion may be formed to be larger than the minimum opening width of the through-hole.

Further, while in embodiments 1 and 2 both expansion regions of the second pinching operation surface are folded inwards, they may also be folded outwards. Further, one expansion region may be folded inwards, and the other expansion region may be folded outwards.

Further, while in embodiment 5 a plurality of ribs are arranged in parallel, they may also be arranged so as to cross each other.

EXPLANATION OF REFERENCE SYMBOLS

1 . . . plate material
2, 42 . . . tightening portion
5 . . . first end portion
6 . . . second end portion
7 . . . through-hole (passed portion)
9, 30 . . . first pinching operation surface
11 . . . small-width portion
15, 31, 50, 60, 70, 80, 90, 103 . . . second pinching operation surface
16, 81 . . . escape portion
17, 61, 71 . . . protrusion
18, 40, 51, 100 . . . proximal region
19, 39, 52, 101, 102 . . . expansion region
20, 41 . . . folding edge
38 . . . lightening region (passed portion)
53, 104 . . . connection edge
H1 through H8 . . . hose clamp

The invention claimed is:

1. A hose clamp which is formed into a ring-like shape by bending a strip-like plate material so as to cause it to cross itself in a peripheral plane to thereby form a tightening portion and which can tighten a connection portion between a hose and a mating member thereof by means of this tightening portion, the hose clamp being formed into a shape substantially in line symmetry with respect to an X axis that is a central axis line extending along a longitudinal, lengthwise direction thereof, the hose clamp comprising:

a first end portion arranged at one longitudinal end side and having a first pinching operation surface at an end portion thereof; and a second end portion arranged at the other longitudinal end side and having at an end portion thereof a second pinching operation surface opposite the first pinching operation surface, wherein the hose clamp has an elongated-hole-like through-hole which is open on the first end portion side and is located nearer to the center in the longitudinal direction than the first pinching operation surface;

the hose clamp has a small-width portion which is formed on the second end portion side and located nearer to the center in the longitudinal direction than the second pinching operation surface, the small-width portion being insertable into the through-hole; and the second pinching operation surface includes a proximal region formed to have a smaller width than an opening width of the through-hole and an expansion region arranged at a side edge portion in the width direction of the proximal region so as to be foldable relative to the proximal region, thereby rendering an outer width dimension of the second pinching operation surface wider than the opening width of the through-hole.

2. The hose clamp according to claim 1, wherein, in at least one of the first pinching operation surface and the second pinching operation surface, there is formed, on the surface on the side opposite the surfaces of these pinching operation surfaces facing each other, a protrusion protruding outwardly in the thickness direction.

3. The hose clamp according to claim 1, wherein, at least one of peripheral edge portions of at least one of the first and second pinching operation surfaces is formed with an escape portion which is bent so as to extend toward the opposing surface side.

4. The hose clamp according to claim 1, wherein a recess or a through-hole for slip-prevention is formed in at least one of the first and second pinching operation surfaces.

5. A hose clamp manufacturing method for forming the hose clamp of claim 1, the method comprising the steps of:

an outer width adjustment step in which both end portion sides of the plate material are formed as the first end portion and the second end portion; the first pinching operation surface and the second pinching operation surface are formed at respective distal end portions of the first end portion and the second end portion, and the elongated through-hole is formed nearer to the center in the longitudinal direction than the first pinching operation surface; and, prior to the bending of the plate material along the X-axis into an annular configuration, the second pinching operation surface is shaped in an interference avoiding form exhibiting an outer width dimension not involving interference with a portion of the elongated through-hole;

a tightening portion forming step in which the plate material is bent into an annular configuration along the X-axis, with the center in the longitudinal direction thereof being at the lowermost point, and the second pinching operation surface is caused to pass through the elongated through-hole, whereby the first end portion and the second end portion are caused to cross each other in the peripheral plane to form a tightening portion capable of deformation so as to be reduced and increased in diameter; and a width enlarging step in which, after the tightening portion forming step, the second pinching operation surface is worked into an enlarged-width form in which it is expanded in the width direction.

6. The hose clamp manufacturing method according to claim 5, wherein, in the outer width adjustment step, both side portions in the width direction of the second pinching operation surface are folded to be thereby converted to the interference avoiding form in which an overall outer width thereof is equal to or smaller than an opening width of the through-hole; and, in the tightening portion forming step, this second pinching operation surface is inserted into the through-hole, and both side portions in the width direction are unfolded in the width enlarging step, whereby the second pinching operation surface is converted to the enlarged-width form.

7. The hose clamp manufacturing method according to claim 5, further comprising a protrusion forming step in which, in at least one of the first pinching operation surface and the second pinching operation surface, there is formed, on the surface on the side opposite the opposing surface side, a protrusion protruding outwards in the thickness direction.

8. The hose clamp manufacturing method according to claim 5, further comprising an escape portion forming step in which, in at least one of the first pinching operation surface and the second pinching operation surface, there is formed an escape portion by bending, at least one of peripheral edges toward the opposing surface side.

9. The hose clamp manufacturing method according to claim 5, further comprising a step for forming a recess or a through-hole for slip-prevention in at least one of the first and second pinching operation surfaces.

10. A hose clamp having a ring-like shape defined by a bent strip-like plate material that crosses itself in a peripheral plane to thereby form a tightening portion and which can tighten a connection portion between a hose and a mating member thereof by means of this tightening portion, the hose clamp having a shape that is substantially in line symmetry with respect to an X axis that is a central, longitudinal axis line extending along a lengthwise direction thereof, the hose clamp comprising:
 a first end portion arranged at one longitudinal end side and having a first pinching operation surface at an end portion thereof; and
 a second end portion arranged at the other longitudinal end side and having at an end portion thereof a second pinching operation surface opposite the first pinching operation surface,
 wherein the hose clamp has an elongated through-hole which is open on the first end portion side and is located nearer to the center in the longitudinal direction than the first pinching operation surface;
 the hose clamp has a small-width portion which is formed on the second end portion side and located nearer to the center in the longitudinal direction than the second pinching operation surface, the small-width portion being dimensioned as to be insertable into the through-hole; and
 the second pinching operation surface further comprises a distal region that is formed of a larger width than that of the opening width of the through-hole at a location where the hose clamp crosses itself in the peripheral plane, and wherein the second pinching operation surface includes protrusions bordered by side edges defining the larger width of the distal region of the second pinching operation surface.

11. The hose clamp of claim 10 wherein the distal region of the second pinching operation surface has substantially the same width as a distal region of the first pinching operation surface.

12. The hose clamp of claim 10 wherein the side edges of the larger width are bent edges defining an escape portion.

13. The hose clamp of claim 12 further comprising a free end bent edge at a distal most end of the second pinching operation surface.

14. The hose clamp of claim 10 wherein the distal region comprises at least one longitudinally extending bend line.

15. The hose clamp of claim 14 wherein the distal region comprises a pair of parallel, longitudinally extending bend lines.

16. The hose clamp of claim 10 wherein each of the first and second pinching operation surfaces comprise slip-prevention surfacing.

17. The hose clamp of claim 16 wherein slip-prevention surfacing includes a recess or a through-hole.

18. The hose clamp of claim 10 wherein the location where the hose clamp crosses itself is diametrically opposite to a central longitudinal location of the hose clamp.

* * * * *